United States Patent [19]

Sapoff

[11] Patent Number: 4,994,241
[45] Date of Patent: Feb. 19, 1991

[54] CATALYST RECOVERY THROUGH AND PROCESS FOR UNLOADING MULTI-TUBE REACTORS WITH MAXIMUM DUST CONTAINMENT

[75] Inventor: Paul C. Sapoff, Louisville, Ky.

[73] Assignee: Catalyst Technology, Inc., Buckner, Ky.

[21] Appl. No.: 430,128

[22] Filed: Nov. 1, 1989

Related U.S. Application Data

[60] Continuation of Ser. No. 772,139, Sep. 3, 1985, abandoned, which is a division of Ser. No. 514,287, Jul. 15, 1983, Pat. No. 4,820,496.

[51] Int. Cl.$^5$ .......................... B08B 9/06; B65G 65/40
[52] U.S. Cl. ................................ 422/219; 422/197; 422/312; 414/216; 414/297; 134/166 C; 134/167 C; 141/1; 141/65; 15/104.16
[58] Field of Search ..................... 422/197, 219, 312; 414/216, 297; 134/166 C, 167 C; 141/1, 7, 8, 11, 65, 97; 15/104.05, 104.14, 104.16, 104.3 R

[56] References Cited

U.S. PATENT DOCUMENTS

| | | |
|---|---|---|
| 2,809,102 | 10/1957 | Hall . |
| 3,028,146 | 4/1962 | Sparks . |
| 3,164,272 | 1/1965 | Oliver . |
| 3,897,220 | 7/1975 | Alcock et al. . |
| 3,911,971 | 10/1975 | Smithson et al. . |
| 3,916,960 | 11/1975 | Thompson . |
| 3,963,062 | 6/1976 | Stahl . |
| 3,964,528 | 7/1976 | Smithson et al. . |
| 4,263,944 | 4/1981 | Lindquist . |
| 4,280,983 | 7/1981 | Irwin . |
| 4,312,388 | 1/1982 | Hager et al. . |
| 4,411,705 | 10/1983 | Easley, Jr. et al. . |

OTHER PUBLICATIONS

Airetool Catalog, Dresser Industries, Inc., 1983, p. 18.

Primary Examiner—Robert J. Warden
Assistant Examiner—Lynn M. Kummert
Attorney, Agent, or Firm—Oliff & Berridge

[57] ABSTRACT

A catalyst trough containing multiple guide tubes in registry with the tubes of a multi-tube catalytic reactor is utilized to unload catalysts therefrom with maximum dust containment and maximum catalyst recovery. The catalyst recovery trough contains an outlet collar connected to an outlet line and a positive fastener whereby the trough is fixedly but detachably connected to the tube sheet of the reactor. The guide tubes extend vertically upwardly from the bottom of the trough and are open in the bottom so as to allow the provision of flexible steel rods or "fish tapes", which may or may not be equipped with high-fluid pressure tubes as air-lances for feeding into the tubes of the reactor, which are on center with the guide tubes of the trough. In this manner any catalytic material which is stuck or bridged across the catalytic tubes may be dislodged so as to fall by gravity into the recovery trough and into an outlet line for recovery.

9 Claims, 5 Drawing Sheets

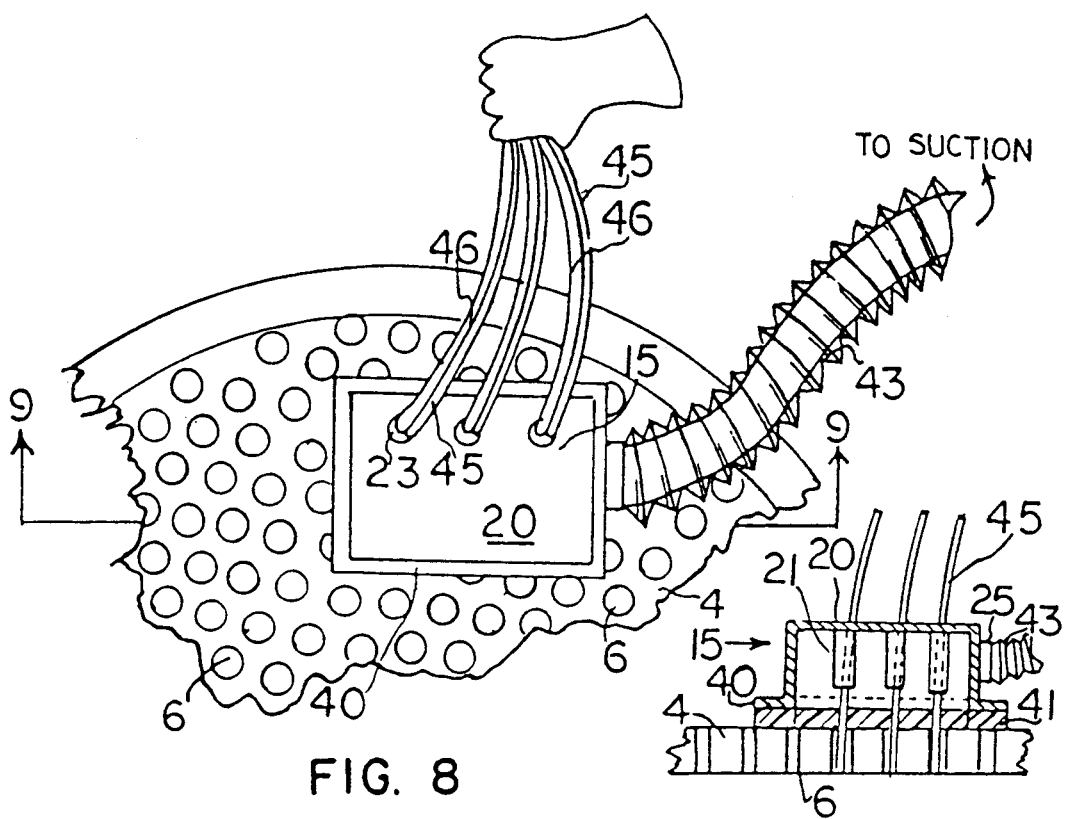
FIG. 8
FIG. 9
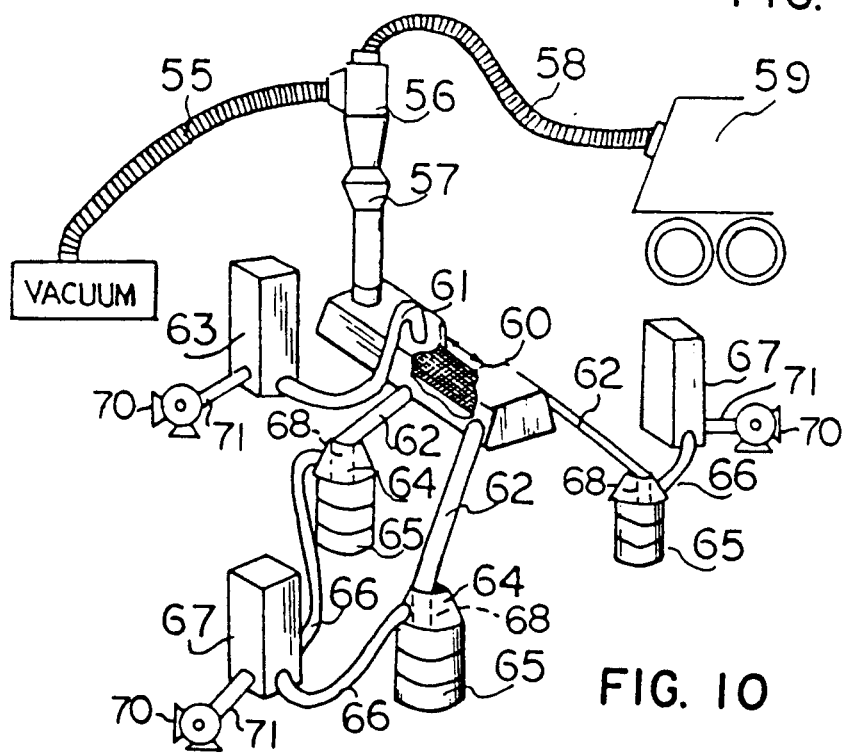
FIG. 10

CATALYST RECOVERY THROUGH AND PROCESS FOR UNLOADING MULTI-TUBE REACTORS WITH MAXIMUM DUST CONTAINMENT

This is a continuation of application Ser. No. 06/772,139, filed Sept. 3, 1985, now abandoned, which in turn is a divisional application of Ser. No. 06/514,287, filed July 15, 1983, now U.S. Pat. No. 4,820,496.

FIELD OF THE INVENTION

This invention relates to an apparatus and a process for unloading catalysts from multi-tube reactors quickly and with maximum dust containment. The invention is particularly applicable to jacketed multi-tube reactors used in the production of ethylene oxide, phthalic anhydride, and maleic anhydride, but is not limited to such uses.

BACKGROUND OF THE INVENTION

Each of the reactions for producing ethylene oxide, or the production of phthalic anhydride or maleic anhydride, is highly exothermic, involving the controlled oxidation of organic substances. Thus, it is necessary that the heat generated by the reaction be removed as efficiently as possible so as to prevent a run-away reaction in which undesirable products are produced and in which expensive raw materials are wasted. Accordingly, it has been the practice to utilize catalytic tubes of extremely narrow diameter. Thus, for example, it is not unusual for a catalyst tube to have an I.D. of 1.25 inches and to be 60 feet long. The reactor, however, may contain as many as 2500 to 9000 tubes. In one instance, for example, the reactor had tubes which were only 22 feet tall, but each tube had an I.D. of ¾ inches and the reactor contained 8600 tubes Each of the tubes are connected at each end to a tube sheet, and the entire bundle of tubes and tube sheet is jacketed and filled with a heat transfer fluid or medium, as, for example, Dowtherm, mercury, or molten salt solutions. Due to the heat given off by the reaction, the space velocity is maintained at an extremely high rate so that there is considerable abrasion of the catalytic spheres within the small diameter tubes. Additionally, hot spots can occur within the reactor. When this occurs, the catalyst bridges over and that tube may be lost from service. This, of course, depends upon the severity of the spot. Additionally, in the case of ethylene oxide, for example, one patentee points out that the optimum temperature for the reaction is in the range 225°-250° C. If the temperature falls below 225° C., the conversion rate is insufficient to be economically feasible. If the temperature goes above 250° C., the ethylene oxide selectivity decreases significantly with the concomitant loss of the desired end product It is obvious, of course, that if the reaction gets too far out of hand that the end product is carbon dioxide and the catalyst becomes fused throughout the length of the 20-60 feet of small-diameter tubes.

DESCRIPTION OF THE PRIOR ART

In the past, the practice has been to increase the temperature as the activity begins to decrease to compensate for the decreased activity. As just pointed out, however, this has limitations, since one the temperature is increased above a certain limit, there is sufficient loss of the desired end product to make the process economically unfeasible. It then becomes necessary to unload the catalyst, which by this time has some fused spheres bridging across portions of the tubes, dust, and possibly even carbonaceous deposits on the catalyst. In the past, this has been practiced by the lowest paid laborers in the plant. These laborers would utilize flexible steel rods, or "fish tapes", which would extend the length of the tubes, and reciprocate them whenever they found an obstruction due to stuck catalytic material. This allowed the catalyst to fall by gravity to the bottom of the reactor to be collected. Unfortunately, all of the dust which had formed over the one or two years of operation would also fall directly onto the workmen. Ultimately, OSHA ordered that it would be necessary for the workmen to wear complete protective equipment containing an external source of air supply.

SUMMARY OF THE INVENTION

According to this invention, several tubes can be unloaded by gravity, and the stuck or bridged-over catalyst can be dislodged by reciprocation or by air jets with essentially complete containment of dust and with complete recovery of catalyst. Since, in the case of ethylene oxide, the catalyst comprises silver oxide on alpha alumina spheres, recovery of the dust is in itself a worthwhile goal. Additionally, because of the containment of the dust, the health of the workmen is not deleteriously affected. Furthermore, since the dust contains valuable metals, recovery is economically justifiable on this basis alone. The reactor is unloaded by the provision of three or more guide tubes extending vertically from the bottom of the receiving trough in registry with the tubes of the reactor. Guide means are provided on the sides of the trough so as to properly align the guide tubes with the tubes in the reactor, and the tubes open at the bottom so as to allow the flexible steel rods or "fish tapes", with or without high-fluid pressure tubes, to be fed into the catalytic reactor tubes so as to dislodge the stuck catalyst, either by reciprocation of the steel rods or by injection of high-pressure jets of air. An outlet collar is in communication with the side or bottom of the receiving trough, and is connected to an outlet line, which in turn carries the catalyst and the dust, which falls by gravity, into the receiving trough and thence to storage containers. The line preferably is a vacuum line which assists in conveying the catalyst and the dust to the receiving drums or other receptacles. The materials preferably may first be fed to a solids-dust separator, wherein the dust is filtered and recovered, and the solids are screened, sized, and collected. Any additional dust formed in the screening process is carried off by vacuum lines, and again filtered and recovered.

BRIEF DESCRIPTION OF THE DRAWINGS

FIG. 8 is a view in perspective of the receiving trough of the invention used on the top tube sheet of the reactor with multiple air-lances.

FIG. 9 is a sectional view taken along lines 9—9 of FIG. 8.

FIG. 10 is a diagrammatic flowsheet of the solids-dust separation apparatus, including catalyst screening, sizing, and storage apparatus.

DESCRIPTION OF THE PREFERRED EMBODIMENT

Figure 1:
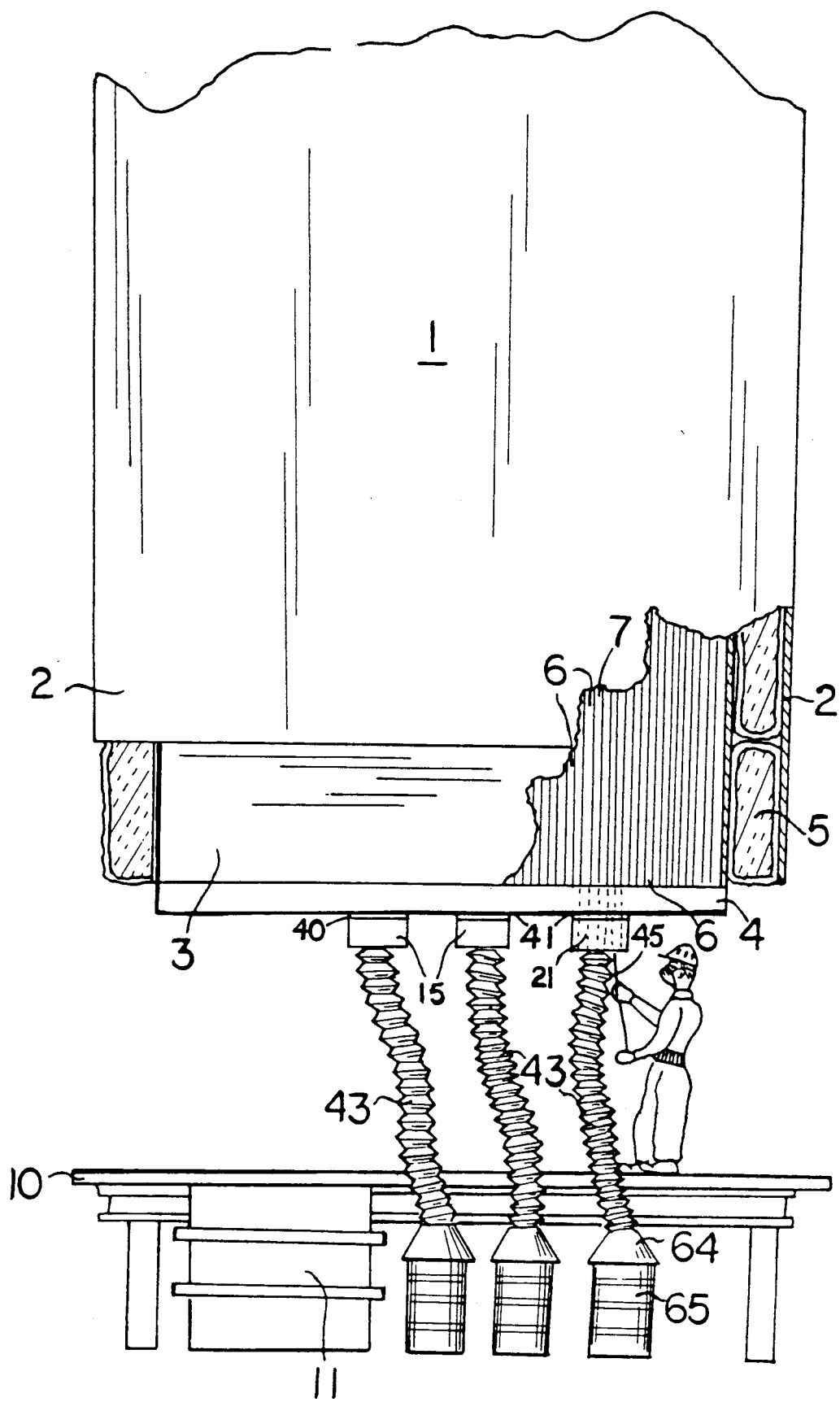
FIG. 1 is a diagrammatic view with parts partially broken away, illustrating a multi-tube catalytic reactor with the receiving troughs of this invention attached to the tube sheet and feeding by gravity through outlet lines into recovery troughs.

As previously mentioned, this invention finds its application in processes involving the partial oxidation of ethylene to ethylene oxide, the partial oxidation of naphthalene or other organic materials to phthalic anhydride, and the partial oxidation of benzene or other organic materials to maleic anhydride.

When an attempt is made to oxidize ethylene over a heated silver catalyst, two reactions may occur:

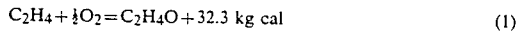
$$C_2H_4 + \tfrac{1}{2}O_2 = C_2H_4O + 32.3 \text{ kg cal} \quad (1)$$

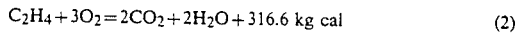
$$C_2H_4 + 3O_2 = 2CO_2 + 2H_2O + 316.6 \text{ kg cal} \quad (2)$$

The first of these reactions results in the production of ethylene oxide, while the second, which is one of complete oxidation, results in the generation of a such larger amount of heat. From the figures given in the above reactions, it is apparent that controlled oxidation is largely tied in with the removal of heat from the system, and that for efficiency in the production of ethylene oxide heat removal is all important. As the yield increases and the complete oxidation of the second reaction decreases, the heat generation and the heat transfer medium necessary to remove the heat are greatly reduced. Thus, for example, a 50% yield produces about 8000 kg cal per kg of $C_2H_4O$, whereas an 85% yield produces about 2000 kg cal per kg of $C_2H_4O$. Because of the exothermic nature of the reaction, the catalyst is enclosed in small-diameter tubes containing the silver oxide catalyst on carriers, such as pellets, but preferably on spheres of alpha alumina. A large commercial converter for the catalytic oxidation of ethylene may thus contain a large number of small tubes, each filled with a catalyst on the carrier and with the tubes enclosed in a large chamber in which they are surrounded by heat transfer fluid. Furthermore, the space velocity is maintained quite high so that the contact time of the gases with the catalyst is very short. As previously mentioned, the I.D. of the tubes runs in the range of from greater than 1.5 inches to less than ¾ inch, and the lengths of the tubes range from 10 feet to 60 feet. Some reactors will contain 2500 tubes, while some of the even larger reactors will contain more than 20,000 of the small-diameter tubes. The production of phthalic and maleic anhydrides are also highly exothermic. Phthalic anhydride may be prepared by the partial oxidation of naphthalene, which is melted and pumped to a vaporizer, where it is vaporized by bubbling primary pre-heated air through the molten material. Additional secondary air is added to the primary air-naphthalene vapor stream in a mixing section in the exit pipe from the vaporizer to bring the air-naphthalene ratio to 25:1 by weight. This vapor mixture is then led to a converter consisting of multiple tubes filled with supported vanadium pentoxide catalyst. Heat (8000–10,000 Btu/lb naphthalene) is removed from the tube skins of the fixed catalyst, either by mercury under suitable pressure, or by pumping molten salt solutions across the tube bank. In the converter, the naphthalene is oxidized to phthalic anhydride, carbon dioxide, and water, at a temperature ranging from 675°–850° F., and a contact time of 0.1 seconds. Careful adjustment of reaction conditions is necessary. The ever-present danger of over-oxidation to maleic anhydride, and of complete combustion to carbon dioxide and water, necessitates the choice of relatively low temperatures and contact times. At excessively mild operation conditions, on the other hand, the extent of hydrogen conversion will be economically insufficient. Phthalic anhydride can also be produced by the partial air-oxidation of xylene and other substituted benzenes utilizing supported vanadium pentoxide catalysts. Again the diameter of the tubes is about 25 mm (I.D.) and they may range in height from 10 to 40 feet. Maleic anhydride, of course, is a by-product, usually unwanted, of the production of phthalic anhydride. The production of maleic anhydride, in and of itself, is usually through the partial oxidation of benzene, which is vaporized with compressed air at a pressure of 2–3 atm to obtain the correct benzene:air ratio. Theoretically, about 106 ft$^3$ of air is required per pound of benzene, oxidized according to the reaction:

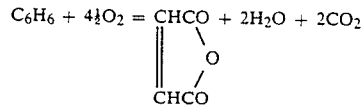
$$C_6H_6 + 4\tfrac{1}{2}O_2 = \begin{array}{c} CHCO \\ \| \phantom{x} \diagdown \\ \phantom{xx} O \\ \| \phantom{x} \diagup \\ CHCO \end{array} + 2H_2O + 2CO_2$$

Again, the vapor mixture is blown through a multi-tube converter containing vanadium pentoxide catalyst supported on alundum spheres. The reaction is highly exothermic, and, once initiated, is self-supporting. The temperature of 400°–450° C. is maintained by efficient heat removal. The heat liberated ranges from 10,500–13,500 Btu per pound of benzene reactant Special cooling means, such as circulating mercury or fused salts across the tube banks, are necessary, as well as a high space velocity and a low contact time of approximately 0.1 second at about 1 atm pressure.

Due to the extreme exothermic reactions involved in the production of these chemicals, the raw material and air mixtures are fed through the catalytic tubes at extremely high space velocities, under normal U.S. practice, so as to help in the elimination of heat from the tubes through the skin wall to the heat transfer medium. As has been previously pointed out, the selectivity of the process is extremely important, and if the reaction temperature can be maintained to produce the desired product, the amount of heat liberated is minimized. However, once the undesired reaction starts, the amount of heat liberated is increased so that the amount of heat removal required to maintain the temperature is increased, and inevitably hot spots occur in the catalyst tubes, or in some of them, so as to cause bridging or partial bridging of the catalytic particles together. As this occurs, the activity of the catalyst decreases, and it is necessary to increase the temperature to maintain the proper outlet with the concomitant problems of loss of activity and disproportionate increase of the temperature within the catalytic tubes. It is thus seen that the transfer of heat from the center of the tube to the skin of the tube through to the heat transfer medium on the outside of the tube is critical.

After a period of time, the activity of the catalyst is so much diminished, and the selectivity of the catalyst is so much diminished that it becomes economically unfeasible to maintain operation with the same catalyst. It thus becomes necessary to unload the catalyst from each of the small-diameter tubes, which, as has been previously indicated, range from ¾ inch to greater than 1.5 inches I.D. Again, the number of tubes in a reactor may range anywhere from 2500 to 20,000, and the length of the tubes may range anywhere from 10 feet to 60 feet. Needless to say, the loss of income during downtime is enormous, and it is essential that the catalyst be unloaded and transferred to proper receptacles as quickly and as effortlessly as possible.

As has previously been pointed out, in the case of the ethylene oxide catalyst, the active catalytic material is silver, which is of substantial value and worthy of recovery. In the production of phthalic and maleic anhydrides, the catalyst is vanadium pentoxide, again on alundum or alpha alumina spheres, and the metal dust is of considerable value. Furthermore, the dust which is released in the gravity unloading of the tubes is so great as to cause health hazards, and OSHA has ordered that workers involved in unloading the catalyst be required to wear completely protective gear with a completely separate source of breathing atmosphere.

Figure 2:
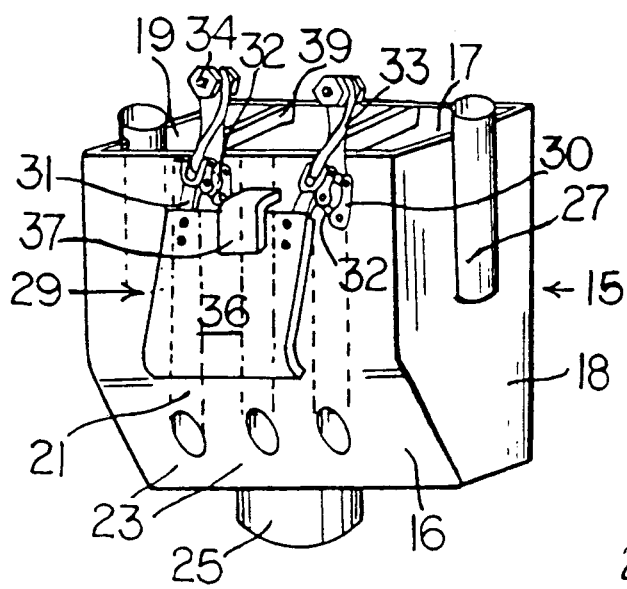
FIG. 2 is a perspective view of the recovery trough of this invention.
Figure 3:
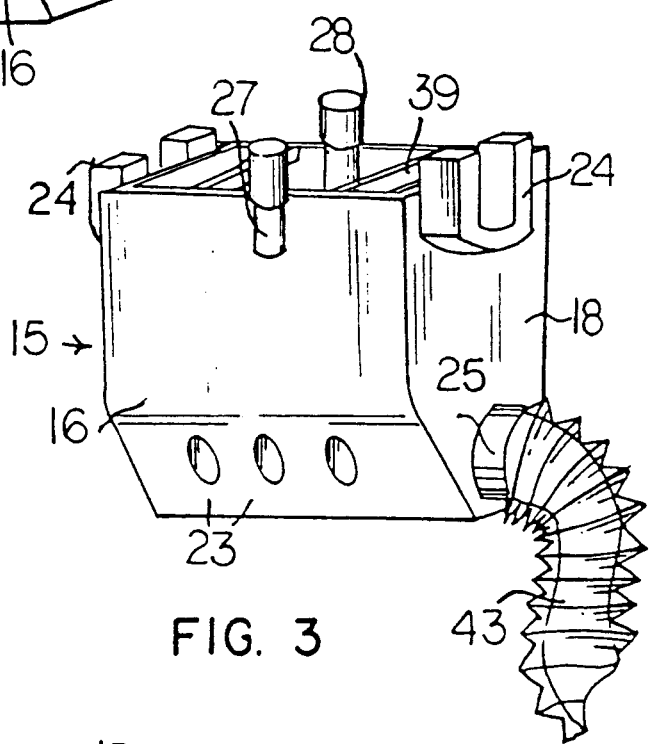
FIG. 3 is another embodiment of the receiving trough of this invention.
Figure 4:
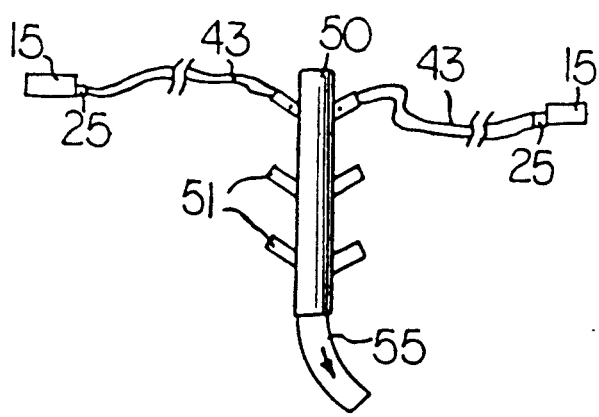
FIG. 4 is a diagrammatic view of a multiple trough arrangement with vacuum lines leading from each trough to a vacuum manifold.
Figure 5:
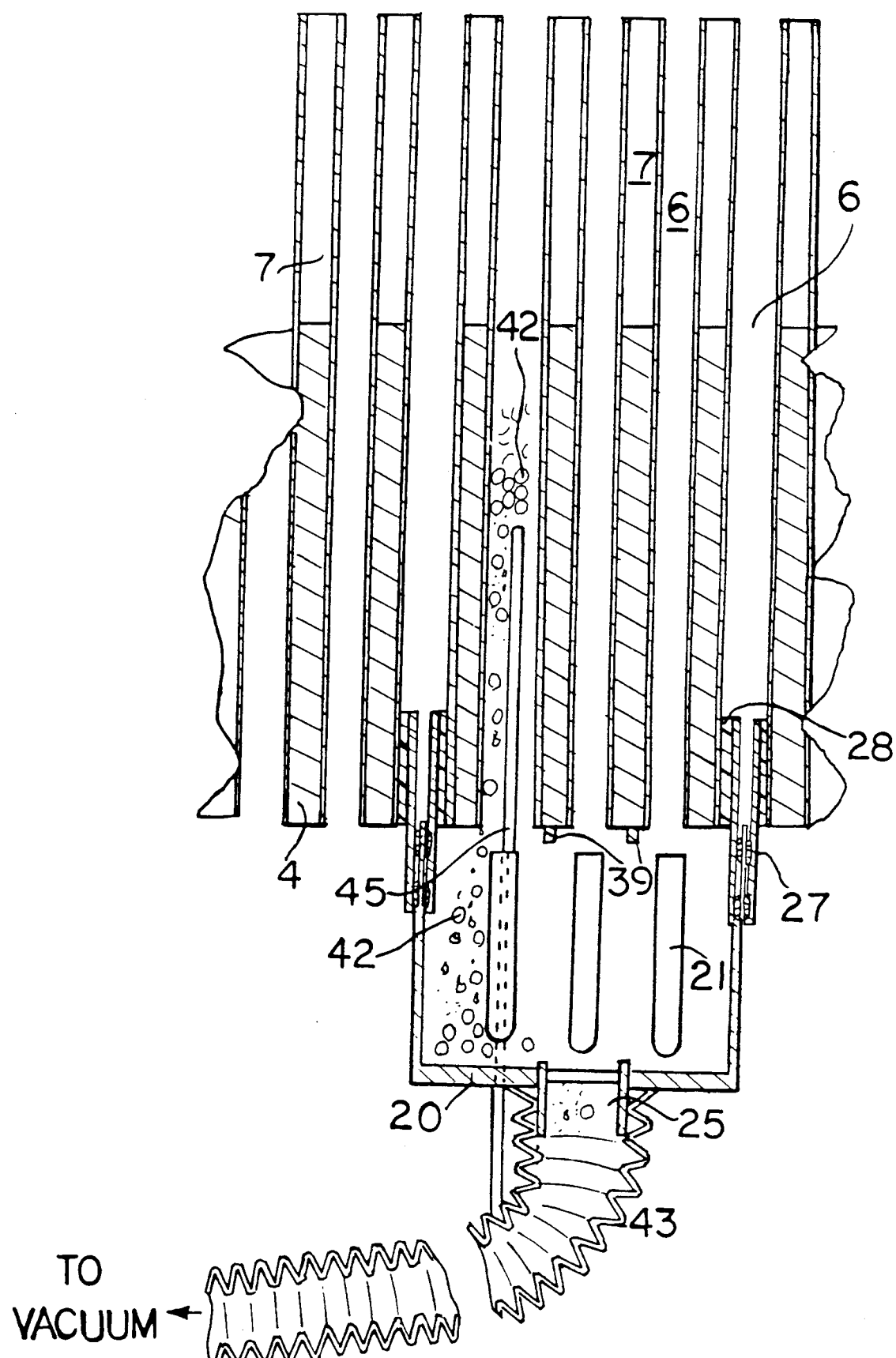
FIG. 5 is a fragmentary view with parts in section illustrating the relationship of the receiving trough and the steel strips or rods feeding through the guide tubes and into the reactor tubes.

Referring now to the drawings, it will be seen that, by the practice of this invention, the catalyst can be unloaded, several tubes at a time, into a receiving trough which is detachably connected to the tube sheet. Referring now to FIG. 1, the reactor 1 has an outer jacket 2 and an inner jacket 3, which has been pulled away at the bottom for purposes of illustration. An insulation layer 5 has also been pulled away, for the most part, so as to illustrate the reactor. The catalytic tubes 6 are shown imbedded in the tube sheet 4 at one end, and are similarly anchored to a tube sheet 4 at the top at the other end, and the space 7 between the tubes is allowed for the liquid heat transfer medium. As is illustrated in FIG. 1, the whole bottom portion of the reactor has been pulled away and a temporary platform 10 and stairway 11 has been built up for the workmen The receiving trough 15 has sides 16 and 17 and ends 18 and 19 and a bottom 20. A flange 40 surrounds the periphery of the trough 15 at the top and is equipped with a gasket 41 (See FIGS. 8 and 9.) A series of guide tubes 21, three as illustrated, extend vertically from the bottom 20 of the receiving trough, and have openings 23 in the bottom 20 of the receiving trough 15 for reception of flat flexible steel rods or "fish tapes" 45, which are guided through the guide tubes 21, which are on center with the catalytic tubes 6. Thus, as is shown, a workman can feed two, or as many as three, fish tapes 45 through the guide tubes 21 so as to dislodge any catalyst bridged across the tubes or stuck, which will then fall out of the tubes 6 by gravity. The receiving trough 15 contains a fastening means 24, which, in FIG. 3, is in the form of a magnet, and which, in FIG. 2, is in the form of a pair of toggle clamps 29 attached to a bracket 30 on the side 17 of the receiving trough 15. The toggle clamp 29 consists of an effort arm 31, a middle arm 32 pivoted to the bracket and to the work arm 33, which terminates at the end with a bolt 34, having a threaded shank and a nut at the end. A handle 36 connects the two effort arms, or effort linkages, 31 to each other, and a stop 37 is welded to the side 17 to prevent the handle from moving too far. A pair of cross supports 39 are shown in FIG. 2 across the top of the receiving trough 15 and lend added support to the trough 15. The outlet collar 25 is shown in FIG. 2 and extends from the bottom 20 of the receiving trough 15. In FIG. 3 the collar 25 extends from the end 19 of the receiving trough 15. This collar connects to an outlet tube 43 so that, as the fish tapes are fed through the guide tubes 21 on the tube centers of the reactor tubes 6, the catalyst 42 and dust falling by gravity into the receiving trough can be conveyed through the outlet tube to a drum or other receptacle for proper storage. A pair of guide means or plugs 27, having a plastic covering 2 snugly fit in the tubes 6 of the tube sheet 4 and are mounted on each end 18 and 19 of the trough 15. Expandible plugs, commonly referred as plumbers' plugs, can serve a dual purpose as guide plugs 27 and at a fastening means 24.

Figure 6:
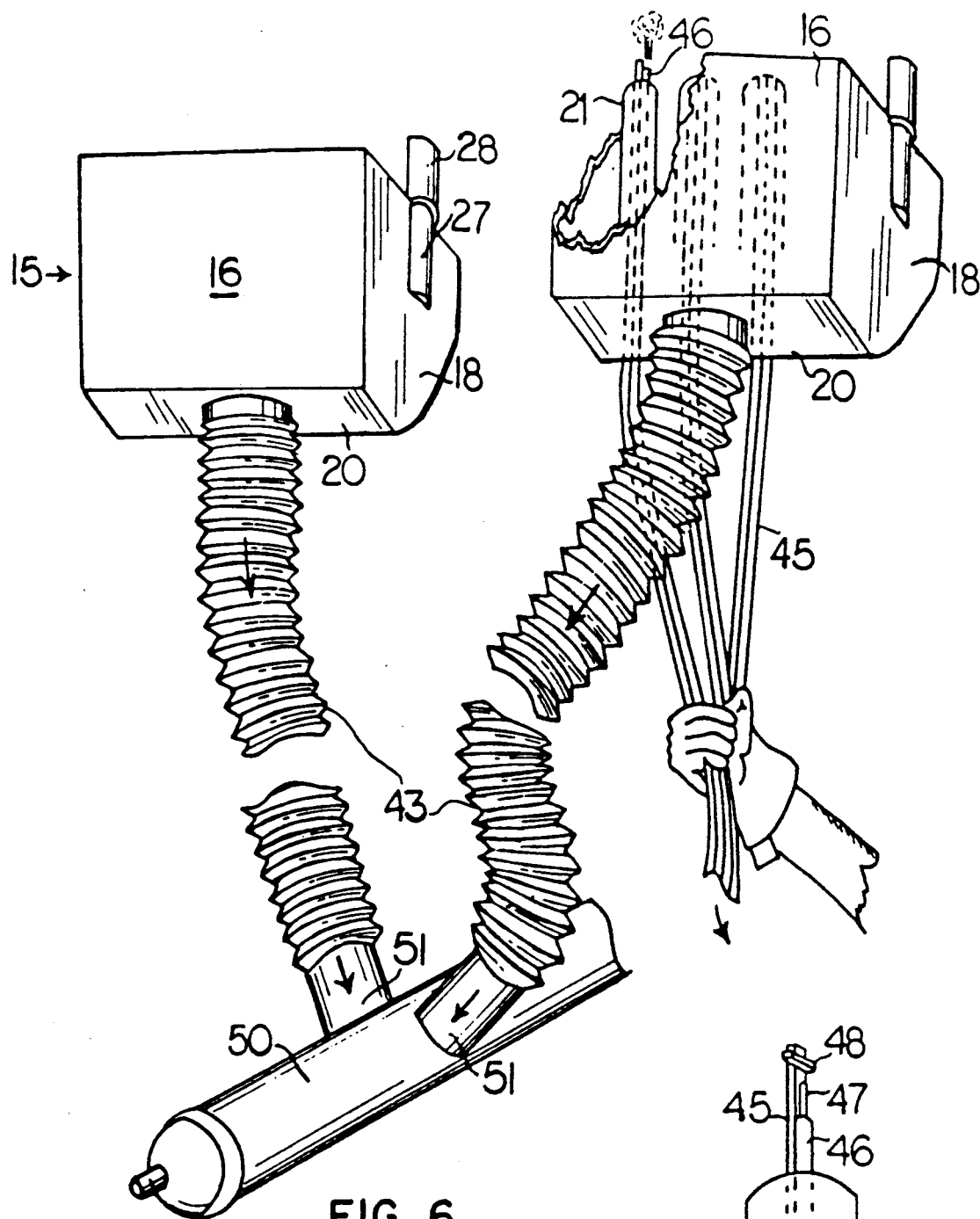
FIG. 6 is a fragmentary view partially in perspective illustrating the use of multiple air-lances in the form of high-fluid pressure tubes in the guide tubes of the receiving trough.
Figure 7:
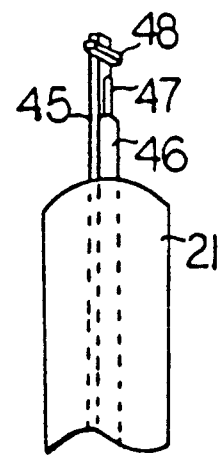
FIG. 7 is a fragmentary view of the air-lance and nozzle attached to the supporting steel rod or "fish tape" and its relationship to the guide tube of the receiving trough.

Whenever the workman comes across an obstruction within the catalyst tube 6, he can reciprocate the flexible steel rods and break lo any catalyst 42 which is stuck or bridged over in the narrow catalyst tubes. As is illustrated in FIG. 6, multiple receiving troughs can be used in a particular reactor and the flexible steel rods may be attached to an air-lance made up of a high-pressure fluid tube 46 and a nozzle. In this instance, as is shown in FIG. 7, the fish tape, or flexible steel rod, 45 has a crosspiece 48 which tends to prevent the air-lance and its support in the form of the flexible steel rod 45 from slipping out of the bottom opening 23 of the guide tube 21. In the instance with multiple receiving troughs are used, a vacuum manifold 50, containing series of nipples 51, is provided so that the vacuum hoses 43 running between the receiving troughs 15 and the vacuum manifold can be connected. In instances where a vacuum is drawn on the outlet tube 43, the flange 40 and the gasket 41 are not used, since ambient air is drawn in around the top of the trough and the dust and catalyst particles are conveyed through the vacuum line 43, ultimately, to the storage drums 65 or other storage receptacles.

However, where the air-lances are used, it is not necessary to reciprocate the steel rods or fish tapes 45 within the catalyst tubes since the jets of high-pressure fluid tend to break loose any catalyst material which tends to be stuck, and the catalyst then falls by gravity to the receiving trough and through collar 25 to the hose 43 to the vacuum manifold, and thence to the proper receptacle for storage, as will hereinafter be pointed out. Furthermore, whenever the air-lances are used the flange 40 and the gasket 41 are preferably employed. Additionally, it is possible, through the use of the air-lances, to attach the receiving trough to the top tube sheet of the reactor, as is illustrated in FIG. 8, and exert sufficient pressure through the air-lances to actually blow the dust and catalyst particles upwardly into the receiving trough 15, wherein the vacuum line 43 would pull the dust and solid material on for further processing.

The further processing is illustrated in FIG. 10, which illustrates a vacuum line 55 running from the vacuum manifold 50 to the cyclone separator 56. The cyclone separator has an air-lock 57, which allows the dust in the top of the cyclone separator 56 to go by vacuum line 58 to the truck containing the vacuum pump and filter for collection, and which allows the solid material to go through the air-lock into the housing 60, containing a vibrating screening mechanism and conveyor (not shown) for screening and sizing the catalyst. A vacuum tube 61 carries away any catalytic dust or fines generated in the screening and sizing operation. Vacuum tube 61 is in operative relation with bag filter 63, which collects any dust from housing 60. The sized and screened catalyst 42 is conveyed through tubes 62 to receiving drums 65, each equipped with domed hoods 64, which are described in detail in U.S. Pat. No. 4,312,388, which belongs to the principals of the assignee of this application. As is shown in that patent, air is drawn up around the periphery of the domed hood 64 and goes via line 66 to dust collector 67 for collection of any residual dust or fines which might have developed in the screening and sizing operation within housing 60. As previously mentioned, the air-lance would involve the provision of compressed air or other compressed fluid in the range of from 50 to 2500 psi. If the air-lance were used as illustrated in FIG. 8, from the top tube sheet of the reactor, to force the catalyst and dust upwardly into a receiving trough 15 which had a vacuum drawn on it, a higher amount of pressure would be involved. The gasket 41 and flange 40 arrangement would be essential in this instance.

The amount of vacuum that can be produced by the vacuum pump on the truck is in the range of 3–15 inches of mercury, so that the amount of air running through the trough would be in the range of 300–650 cfm.

While a preferred embodiment of this invention involves the vacuum tube 43 directly connected to the trough, it is not absolutely essential that this be done in this way. The catalyst and dust may be unloaded by gravity so long as the domed hoods 64, as further described in U.S. Pat. No. 4,312,288, are used on the receiving drums 65 and ambient air is drawn through the hood to prevent any dust from escaping to the atmosphere. Thus, the dust and catalyst can be loaded directly into the drums or receptacles 65 in which the removed catalyst is to be loaded and any residual dust drawn to a bag filter for collection.

Many modifications will occur to those skilled in the art from the detailed description hereinabove given, which is meant to be exemplary in nature and non-limiting except so as to be commensurate in scope with the appended claims.

I claim:

1. A method of removing fused catalyst from a reactor having a plurality of vertical tubes for containing the catalyst comprising:
   securing a receiving means on a tube sheet which is in contact with said vertical tubes at an end of the vertical tubes, said receiving means including guide tubes extending therein through which pass dislodging means;
   dislodging fused catalyst from the tubes;
   collecting dislodged catalyst in said receiving means;
   capturing substantially all catalyst dust formed by the dislodging step in the receiving means, said capturing step including positioning ends of the guide tubes extending into said receiving means adjacent openings in the vertical tubes; and
   conveying the dislodged catalyst and catalyst dust from the receiving means.

2. A method as in claim 1 wherein the step of collecting the catalyst dust includes establishing a vacuum in the receiving means.

3. A method as in claim 2 wherein the step of dislodging fused catalyst comprises manual manipulation of the dislodging means.

4. A method as in claim 1 wherein the step of collecting the catalyst dust includes establishing a seal between the receiving means and bottom openings of the tubes.

5. A method as in claim 4 wherein the step of dislodging fused catalyst comprises manual manipulation of the dislodging means.

6. The method as in claim 1 wherein the dislodging step comprises impacting fused catalyst with a rod-like member.

7. The method as in claim 6 and further comprising separating the catalyst dust from the catalyst and collecting the dust.

8. The method as in claim 1 wherein the dislodging step comprises directing a high pressure jet of fluid at the fused catalyst.

9. A method as in claim 8 wherein the fluid is directed downwardly in the tubes against the fused catalyst.

* * * * *